United States Patent Office 3,461,667
Patented Aug. 19, 1969

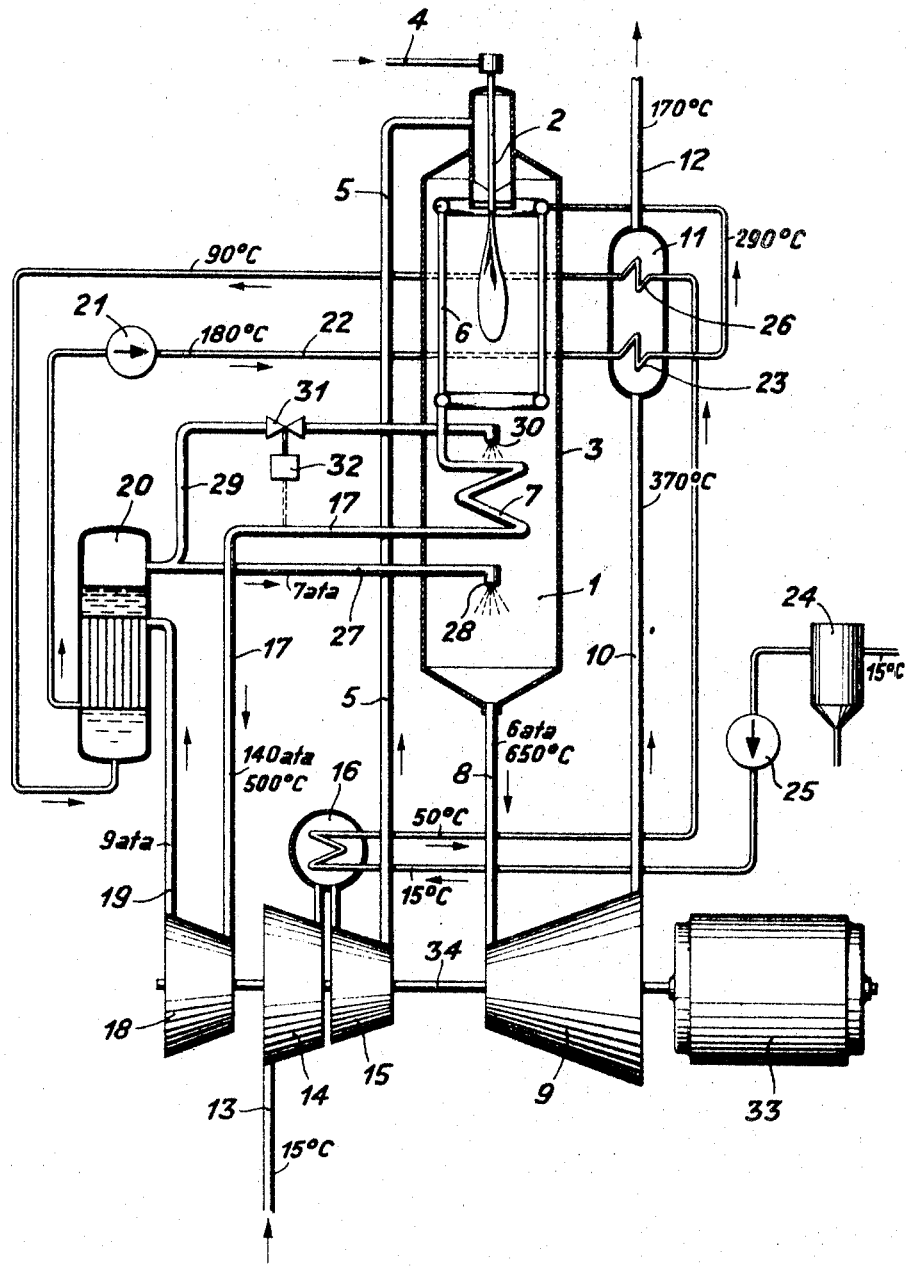

3,461,667
METHOD AND APPARATUS FOR MIXING GAS AND STEAM IN A GAS TURBINE PLANT
Emile Albert Aguet, Winterthur, Switzerland, assignor to Sulzer Brothers, Ltd., Winterthur, Switzerland, a corporation of Switzerland
Filed Nov. 8, 1967, Ser. No. 681,340
Claims priority, application Switzerland, Nov. 10, 1966, 16,201/66
Int. Cl. F02g 5/00; F02b 47/00; F02c 7/00
U.S. Cl. 60—39.05   17 Claims

ABSTRACT OF THE DISCLOSURE

The water for the heater elements of the combustion chamber is cycled in a closed circuit while an auxiliary flow of water is heated to steam by a heat exchange with the expanded steam of the closed circuit. The generated steam is then mixed with the combustion gases in the combustion chamber and fed to the gas turbine.

---

This invention relates to a method and apparatus for mixing gas and steam in a gas turbine plant. More particularly, this invention relates to a method and apparatus for mixing gas and steam within a combustion chamber upstream of a gas turbine.

Heretofore, gas turbine plants have been known to use a method of mixing gas and steam for operation in which the plants, when used as peak-load power stations, afford an optimum proportion between installation costs and running costs by combining low installation costs with good fuel utilization. In this method, water is fed into heater elements in a combustion chamber, is evaporated to steam at a pressure higher than the combustion chamber pressure and superheated, and then is expanded in a steam turbine. Thereafter, the expanded steam is mixed with the combustion gases in the combustion chamber before entering the gas turbine of the plant. Such an operated plant allows a high thermal efficiency to be attained at low plant costs since, as compared with a steam turbine plant, the large and therefore expensive low-pressure parts required in the steam turbine plants are unnecessary. Further, an intermediate superheating of the steam expanded in the steam turbine has been easily achieved by mixing of the steam with the combustion gases from the combustion chamber without requiring additional heat transfer surfaces.

An object of this invention is to further reduce the running costs of a gas turbine plant of the above type.

It is another object of the invention to maintain a high thermal efficiency at relatively low plant cost.

It is another object of the invention to reduce the costs of water treatment in gas turbine plants.

It is another object of the invention to reduce the need of using water of high purity in admixing with the combustion gases in a gas turbine.

It is another object of the invention to recirculate water through a gas turbine in a closed circuit to generate steam.

Briefly, the method of the invention consists in initially evaporating water into steam in a combustion chamber of a gas turbine plant at a pressure higher than the combustion chamber pressure, superheating the steam and subsequently expanding in a steam turbine. Thereafter, at least a part of the steam is condensed by a heat exchange with an auxiliary flow of water to evaporate the auxiliary water flow to steam at a lower pressure. The auxiliary flow of low pressure steam is then mixed with the combustion gases in the combustion chamber before passing into the gas turbine of the plant.

The apparatus of the invention is utilized in combination with a gas/steam turbine plant having a combustion chamber in which heater elements for evaporating and superheating water to steam are disposed, a gas turbine adjacent the combustion chamber for receiving the combustion gases of the combustion chamber and a steam turbine disposed downstream of the heater elements for expanding the generated steam. The apparatus includes a heat transfer means downstream of the steam turbine for receiving a flow of steam from the steam turbine on a primary side and a flow of auxiliary water from a separate water source on a secondary side. The heat transfer means functions as a steam condenser to condense the steam in the primary side in order to generate an approximately equal quantity of steam at lower pressure on the secondary side. A mixer is connected to the secondary side of the heat transfer means and disposed within the combustion chamber to receive the generated steam of lower pressure and mix the steam with the combustion gases in the combustion chamber for flow into the gas turbine.

The primary side of the heat transfer means is connected to the heater elements so that the condensed steam is fed afresh into the heater elements through a feed pump to thereby form a closed circuit through the heater elements. Thus, the steam expanded in the steam turbine is not directly admixed with the combustion chamber gases but is used for the evaporation of water in the heat transfer means while the steam produced in the heat transfer means is introduced into the combustion chamber gases for the gas turbine plant.

These and other objects and advantages of the invention will become more apparent from the following detailed description and appended claims taken in conjunction with the accompanying drawing in which:

The figure schematically illustrates a gas turbine plant constructed in accordance with the invention.

Referring to the drawing, the gas turbine plant has a combustion chamber 1 in which a burner 2 and a jacket 3 are disposed. The burner 2 is fed fuel through a pipe 4 and air through a pipe 5. In addition, heater elements 6, 7 are disposed in the combustion chamber 1, for example, in the form of coiled tubes. One heater element 6 functions as a pre-heater and evaporator while the other heater element 7 functions as a superheater in known manners.

A pipe 8 connects the outlet of the combustion chamber 1 to a gas turbine 9 for conducting the combustion gases from the chamber 1 into the gas turbine 9. These gases, after passing through the gas turbine 9, pass through a pipe 10 to a heat exchanger 11 and thereafter to the atmosphere through a chimney 12.

The air which is fed to the burner 2 is drawn from the atmosphere through a pipe 13, compressed in two compressor stages 14, 15, and then passed into the pipe 5. In addition, an air cooler 16 is disposed in the path of air flow between the two compressor stages 14, 15.

The water vapor generated and superheated by the hot combustion gases in the heater elements 6, 7 is fed from the combustion chamber 1 through a pipe 17 to a steam turbine 18 and expanded therein. The expanded steam is then fed from the steam turbine 18 through a pipe 19 to the primary side of a steam condenser 20 and condensed therein. The condensate formed in the condenser 20 is withdrawn by a feed pump 21 and fed into the heater element 6 through a pipe 22. In passing to the heater element 6, the pipe 22 passes through the heat exchanger 11 so that the condensate can be heated.

An auxiliary flow of water is fed from a suitable source (not shown) through a cleansing plant 24 into a feed pump 25. The feed pump 25 pumps the cleansed water through the air cooler 16 to effect a heat exchange with the combustion air passing to the combustion chamber 1 and, thereafter, via a heater element 26 in the heat exchanger 11 into the secondary side of the steam condenser 20. The auxiliary flow of water in the secondary side of the steam condenser 20 is heated to steam by a heat exchange which effects a condensation of the steam flow in the primary side of the steam condenser. Thereafter, the steam in the secondary side of the steam condenser 20 is passed through a pipe 27 to a mixer 28 disposed in the combustion chamber 1 downstream of the heater elements 6, 7. A branch pipe 29 is connected to the pipe 27 from the condenser 20 to carry a flow of steam to an auxiliary mixer 30 disposed in the combustion chamber 1 between the heater elements 6, 7. This branch pipe 29 has a throttle device 31 disposed therein which is regulated by a control means 32 in response to the temperature of the superheated steam in the pipe 17 emanating out of the combustion chamber 1 from the heater elements 6, 7.

The steam turbine 18 and gas turbine 9 as well as the compressor stages 14, 15 are arranged on a common drive shaft 34 with an electrical generator 33.

In operation, the combustion gases generated in the combustion chamber 1 are cooled by the feed water in the heater elements 6, 7 by evaporation of the feed water to steam and the superheating of the generated steam. The burner 2 thus can operate with a negligible excess of air since no excess air is required for cooling purposes (as otherwise required in gas turbines). For example, the air excess, i.e. the proportion of the quantity of air actually supplied to the stoichiometric quantity of air is at most 2.5 as compared with 5 and more in conventional gas turbine plants. At the same time, the auxiliary water is fed through the cooler 16 and heat exchanger 11 into the secondary side of the steam condenser 20 and heated to steam. This steam then passes through the mixers 28, 30 into the chamber 1 to further cool the combustion gases by mixing with the combustion gases. The amount of condenser steam passing into the chamber 1 from the mixer 30 upstream of the superheater element 7 serves to regulate the temperature of the superheated steam emerging from the superheater element 7 through means of the throttle device 31 and temperature response control means 32 so that the proportional mixture of combustion gas and steam passing into the gas turbine 9 is at a temperature of, for example, approximately 650° C.

Since the same extremely clean water is always flowing in a circuit through the heater elements 6, 7, the steam can be generated at high pressure without the danger of salt depositing on the water side. Consequently, the danger of the heater element pipes becoming overheated is substantially eliminated. Thus, this part of the plant is able to achieve a high thermal efficiency. For example, steam can emerge from the superheater element 7 at 140 atmospheres above atmospheric pressure and at 500° C. and can be expanded to 9 atm. above atmospheric pressure in the steam turbine 18. Thereafter, the steam is condensed and passed into the heat exchanger 11 at a temperature of 180° C. and heated to about 290° C. for recycling through the heater element 6. The auxiliary water, like the feed water, is at an initial temperature of about 15° C. and is heated in the cooler to 50° C. and the heat exchanger to 90° C. for passage into the steam condenser 20. The steam is generated in the steam condenser 20 at a pressure of 7 atm. above atmospheric pressure and is introduced into the combustion gases which are at a pressure of 6 atmospheres above atmospheric pressure. The resultant mixing of this steam with the gases superheats the saturated steam to about 650° C. at 6 atm. above atmospheric pressure.

It is noted that the heater elements 23, 26 in the heat exchanger 11 are so disposed that the heater element 23 of the high pressure circuit is located in the flow of waste gases upstream of the heater element 26 through which the water flows at a lower pressure. A staggering of the temperatures in the heater elements of the heat exchanger is thus achieved to permit good utilization of the heat contained in the waste gases which are at a temperature, for example, of 370° C. upon entry and 170° C. upon exit from the heat exchanger.

It is also noted that the heating elements of the heat exchanger can be eliminated as well as the cooler intermediate the compressor stages in order to simplify the apparatus. Whether the resultant reduction in overall efficiency is balanced by the lower installation costs depends mainly upon the envisaged working life of the plant.

The plant of the invention has the advantage that the water fed to the heater elements, which needs a high degree of purity, is not lost by mixing with combustion gases. Further, the water fed to the secondary side of the steam condenser need not have as high a degree of purity as the water fed into the heater elements of the combustion chamber since there is little risk of overheating the elements of the steam condenser whereas there is such a risk in the water-carrying pipes in the combustion chamber when the water contains deposited salt. Also, the steam condenser can be constructed to permit easy cleaning. Consequently, the water fed into and evaporated in the steam condenser need only have a relatively low degree of purity which can be achieved, for example, by partial desalting or simple decarbonization. Thus, the costs of the water as well as the operation costs of the gas turbine plant are substantially reduced.

What is claimed is:

1. In combination with a gas turbine plant having a combustion chamber for directing a flow of combustion gas therethrough, a plurality of heater elements within said combustion chamber for directing a flow of water therethrough for evaporation to steam, a gas turbine connected downstream of said combustion chamber for receiving the combustion gases from said combustion chamber, and a steam turbine connected downstream of said heater elements for receiving the steam from said heater elements; a steam condenser connected downstream of said steam turbine, said steam condenser having a primary side for receiving the steam from said steam turbine and a secondary side for receiving an auxiliary flow of water to condense the steam on said primary side and to generate an auxiliary flow of steam on said secondary side, and mixer means connected to said secondary side of said steam condenser and disposed in said combustion chamber for mixing the auxiliary flow of steam into the flow of combustion gases.

2. The combination as set forth in claim 1 which further comprises closed circuit means connected between said primary side of said steam condenser and said heater elements for returning the condensed steam from said steam condenser to said heating elements.

3. The combination as set forth in claim 2 wherein said closed circuit means includes a feed pump for directing the condensed steam into said heater elements.

4. The combination as set forth in claim 1 which further includes a multi-stage compressor upstream of said combustion chamber for compressing the flow of combustion gases, and an air cooler connected intermediately of said compressor and disposed upstream of said secondary side of said steam condenser in the path of flow of the auxiliary flow of water for cooling of the combustion gas and heating of the auxiliary flow of water.

5. The combination as set forth in claim 1 which further includes a heat exchanger connected downstream of said gas turbine for passage of the combustion gases therethrough, said heat exchanger having a first heating element therein disposed upstream of said secondary side of said steam condenser in the path of flow of the auxiliary flow of water for heating of the auxiliary flow of water and cooling of the combustion gas.

6. The combination as set forth in claim 5 which further includes a closed circuit means connected between said primary side of said steam condenser and said heater elements for returning the condensed steam to said heating elements, said closed circuit means having a second heating element disposed in said heat exchanger for heating of the condensed steam.

7. The combination as set forth in claim 6 wherein said second heating element of said closed circuit means is disposed upstream of said first heating element in the flow of combustion gas.

8. The combination as set forth in claim 1 wherein said mixer means includes a first mixer downstream of said heater elements in the flow of combustion gas.

9. The combination as set forth in claim 8 wherein said heating elements include a superheater and said mixer means includes a second mixer disposed between adjacent heater elements upstream of said superheater in the flow of combustion gas.

10. The combination as set forth in claim 9 wherein said mixer means includes means for controlling the auxiliary flow of steam through said second mixer in response to the outlet temperature of steam from said superheater.

11. A method of mixing steam and combustion gas in a combustion chamber of a gas turbine plant which comprises the steps of
directing a flow of hot combustion gas through the combustion chamber for passage to a gas turbine,
directing a first confined flow of water into the combustion chamber for heating to steam by the flow of hot combustion gas at a first pressure higher than the pressure in the combustion chamber,
subsequently expanding the generated steam,
thereafter passing an auxiliary flow of water into heat exchange relation with at least a portion of the expanded steam to condense the expanded steam and to generate an auxiliary flow of steam from the auxiliary flow of water at a lower pressure than said first pressure, and
subsequently mixing the auxiliary flow of steam with the flow of combustion gas upstream of the gas turbine.

12. A method as set forth in claim 11 which further comprises the steps of returning the condensed expanded steam into said first flow of water into the combustion chamber to form a closed circuit for the first flow of water.

13. A method as set forth in claim 12 which further comprises the step of preheating the condensed expanded steam prior to entry into the combustion chamber.

14. A method as set forth in claim 11 which further comprises the steps of compressing the flow of combustion gas prior to entry into the combustion chamber and preheating the auxiliary flow of water prior to entry into said heat exchange relation with the compression heat of the combustion gas.

15. A method as set forth in claim 11 which further comprises the step of preheating the auxiliary flow of water prior to entry into said heat exchange relation with the combustion gas passed from the gas turbine.

16. A method as set forth in claim 11 which further includes the step of sequentially preheating the flow of condensed expanded steam prior to passage into the combustion chamber and the auxiliary flow of water prior to said heat exchange relation at reduced temperatures with the combustion gas passed from the gas turbine.

17. A method as set forth in claim 11 wherein the flow of hot combustion gas is combusted with an air excess less than 2.5.

References Cited

UNITED STATES PATENTS

| 3,038,308 | 6/1962 | Fuller | 60—39.55 |
| 3,232,052 | 2/1966 | Ricard | 60—39.18 |
| 3,331,202 | 7/1967 | Brunner. | |

JULIUS E. WEST, Primary Examiner

U.S. Cl. X.R.
60—39.18, 39.55